Aug. 7, 1934.  E. J. MULLEN ET AL  1,969,381
METHOD AND APPARATUS FOR TREATING GASES
Filed Oct. 20, 1931   2 Sheets-Sheet 1
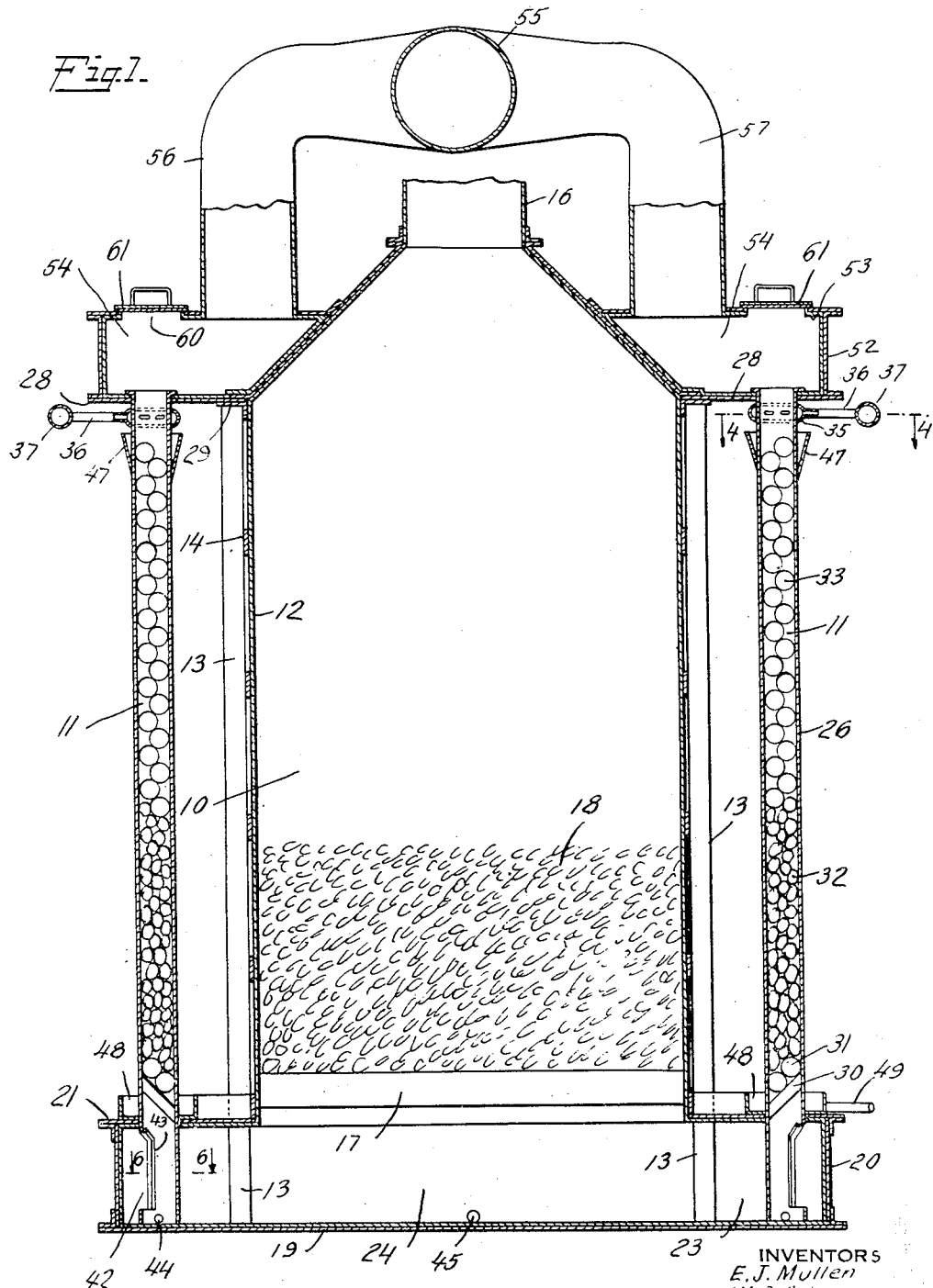

Aug. 7, 1934.　　　E. J. MULLEN ET AL　　　1,969,381
METHOD AND APPARATUS FOR TREATING GASES
Filed Oct. 20, 1931　　　2 Sheets-Sheet 2
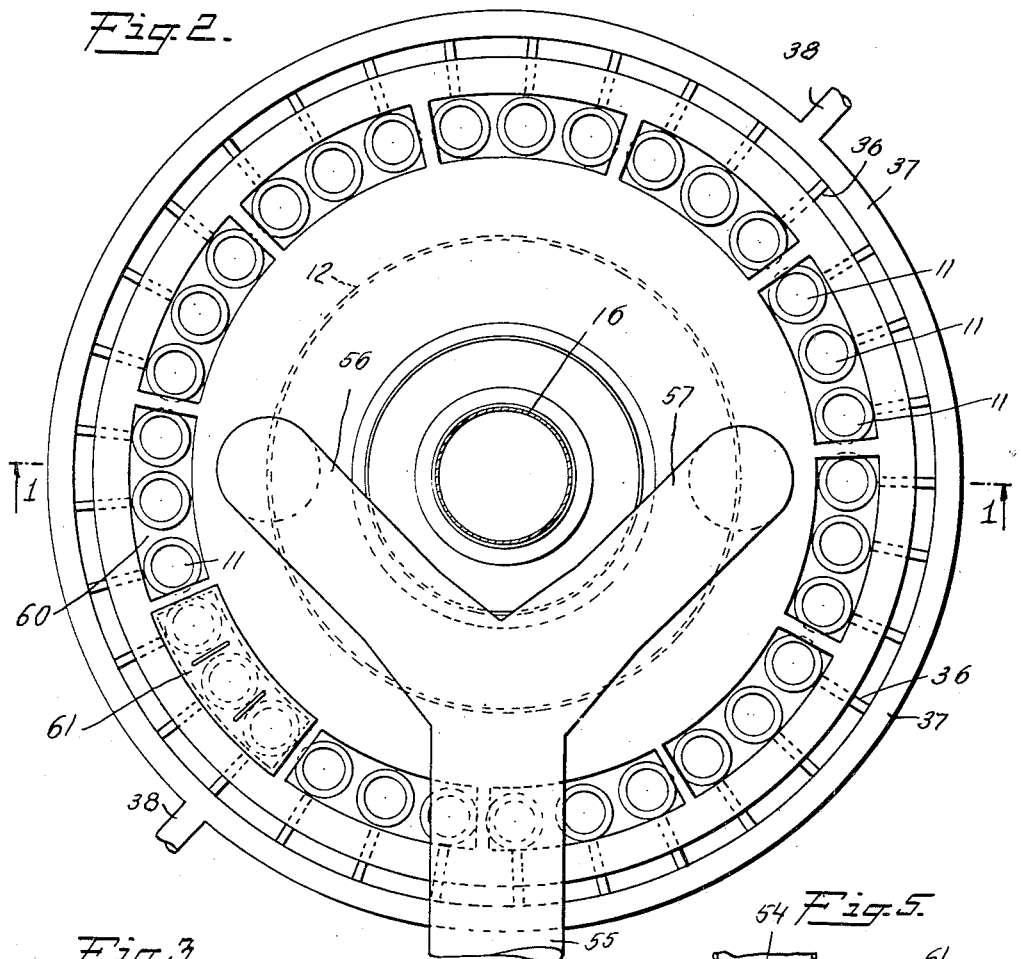
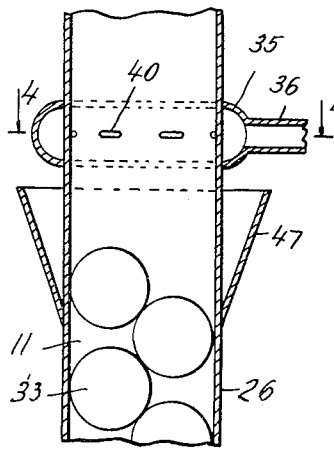
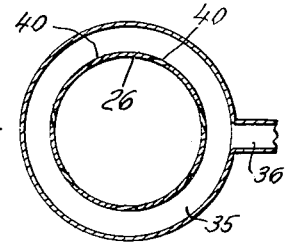
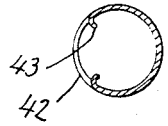
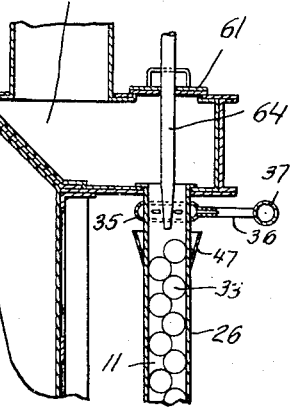
INVENTORS
E. J. Mullen
W. S. Allen
BY
ATTORNEY Patented Aug. 7, 1934

1,969,381

UNITED STATES PATENT OFFICE 1,969,381

METHOD AND APPARATUS FOR TREATING GASES

Edwin J. Mullen, New Rochelle, and Walter S. Allen, Flushing, N. Y., assignors to General Chemical Company, New York, N. Y., a corporation of New York Application October 20, 1931, Serial No. 569,964

4 Claims. (Cl. 183—120)

This invention relates to a method and apparatus for treating gases with liquids, and is more particularly directed to a method and apparatus especially adapted for use in the manufacture of sulfuric acid.

Generally speaking, a contact sulfuric acid plant comprises sulfur burners for the production of a sulfur dioxide gas mixture; scrubbing towers in which purification of the gas is effected and the moisture content thereof substantially increased; coolers and coke boxes for the condensation of relatively large quantities of moisture and the removal of acid mist from the gas stream; drying towers to bring about substantially complete removal of moisture from the gas stream; converters containing suitable catalysts for conversion of the sulfur dioxide gas mixture to sulfur trioxide; and finally, absorbers for extracting sulfur trioxide from the gas stream to form sulfuric acid. In the drying towers, just ahead of the converters, the sulfur dioxide gas stream is dried by contacting the same with strong sulfuric acid circulated through the towers, and in the absorbers, following the converters, the reacted gases are similarly contacted with sulfuric acid to bring about absorption of the sulfur trioxide and the formation of sulfuric acid. Accordingly, at two points in a contact sulfuric acid plant the gas stream is treated with sulfuric acid, and in both operations large quantities of heat are evolved. Although the purposes of contacting the gas stream with acid in the drying towers and in the absorbers differ materially, the physical principles involved, i.e. the contacting of the gas stream with sulfuric acid accompanied by the evolution of much heat, are substantially the same. Hence, it is to be understood that the present invention is applicable to drying and absorbing and similar operations, but for convenience only, will be described particularly in connection with the drying of moist burner gases.

One of the most important phases in the preparation of sulfur dioxide burner gases for catalytic conversion is the drying of the same after washing and scrubbing to effect removal of undesirable impurities, such as arsenic, which interfere with the catalytic action. Water and dilute sulfuric acid are the materials usually employed in the gas scrubbing operation, and accordingly the washed gases contain large quantities of moisture which must be removed prior to catalytic conversion. The essential function of the drying towers is to abstract moisture from the gases, and this is brought about by contacting the gases and drying acid to effect a combination of the water vapor carried by the gas with the sulfuric acid. Heretofore, this drying operation has consisted almost invariably in passing the purified gas from the scrubbing tower upwardly through a drying tower filled with a suitable packing material, such as quartz, down through which large amounts of strong sulfuric acid are passed. By means of the packing, intimate contact of the moist gases with the strong sulfuric acid is effected, and moisture is abstracted from the gases by the action of the strong acid.

The drying operation is accompanied by the evolution of large quantities of heat because of the condensation of the water vapor and the dilution of the sulfuric acid. Unless provision is made to counteract the effect of this generation of heat, the temperature in the drying tower will become so elevated that effective drying will no longer take place. In the present types of drying towers, such as mentioned above, the heat is usually carried off by circulating enormous quantities of sulfuric acid through the drying towers. After withdrawal of the acid from the towers, this heat must necessarily be removed from the acid by supplementary external coolers before the drying acid may be reintroduced into the drying towers. Cooling of this large amount of acid, having a small temperature differential, ranging from about 20° to 40° F. with respect to the cooling water, presents a difficult problem and requires extensive installations of cooling apparatus.

The volume of acid required to keep down the internal tower temperature is entirely out of proportion with the amount of acid theoretically necessary to effect drying. For example, in drying operations in the production of a given quantity of say 66° Bé. contact process acid, where drying towers built in accordance with the prior art are employed, the drying acid required for circulation through the drying towers to effect proper drying is approximately from fifteen to twenty times the amount of product acid obtained. Further, the quantities of acid necessarily circulated through the absorbers of the same plant unit are even considerably larger than those required for the drying towers, since in the absorption operation still greater quantities of heat are evolved.

The objections to prior methods from an efficiency standpoint are numerous. The circulation of an enormously large tonnage of acid through the drying towers and the cooling of the circulating acid in apparatus outside the drying towers requires large installations of pumps, storage tanks and coolers, all of which are expensive both as to first cost and maintenance.

In prior operations, all cooling of the heated drying acid is done outside the towers, and since there is no provision for cooling within the towers, local temperatures inside the towers are much higher than the indicated exit temperatures of either gas or acid. This condition results from imperfect distribution of the acid within the drying tower, thus permitting an unduly large volume of the gas to give up its moisture to a relatively small portion of acid. For this reason, the resulting local temperatures may, in many instances, be high enough to vaporize appreciable quantities of sulfuric acid or sulfuric anhydride. When this occurs, acid vapor goes out of the tower in the exit gas.

In addition to the possibility of carrying vaporized sulfuric acid in the dried gas, considerable amounts of acid spray or spatter are carried along mechanically in the gas stream because of the fact that in the drying towers there is throughout a more or less intimate mixture of gas and acid, and accordingly the rush of the gas through the tower tends to pick up spray from the acid stream which spray is carried out of the drying towers into the succeeding apparatus. Acid carried out of the drying tower, whether as vapor or as entrained spray or spatter, is not only destructive to the apparatus, but also tends to form iron sulfate which accumulates in the flues, blowers, heat transferrer tubes and converters, and thus builds up a high gas resistance which again raises production costs because of the increased power necessary to force the gas stream through the apparatus.

As distinguished from the prior practice, in which drying is effected by contact of an upwardly moving gas stream and a downwardly flowing stream of drying acid, wherein heat generated by drying operation is removed from the acid after the same has been withdrawn from the drying towers, the present invention contemplates a method and apparatus for drying in which the gas to be dried is contacted with a thin film of drying acid flowing over a heat transfer surface arranged so that the heat evolved is removed from the acid substantially as generated, with the result that the drying acid leaves the drying tower or contact chamber at substantially the same temperature at which it enters. By such procedure, the quantity of acid circulated through the drying tower is reduced to the minimum quantity necessary for drying. Hence, with reference to one specific embodiment, the present invention comprehends a method according to which gas to be dried is introduced into and passed through a drying chamber of relatively restricted cross-section equipped with means for distributing a film of acid over the inner walls of the drying chamber so that gases passing therethrough are contacted with drying acid under conditions which tend to reduce to a minimum the quantity of liquid particles which may become entrained in the gas stream. Further, the invention provides for cooling the drying chamber walls, over which the acid film is distributed in such manner that the heat evolved by the drying operation is removed substantially concurrently with generation in amounts sufficient to keep the temperature of the acid and the gases within limits conducive to effect proper drying. On withdrawal of the substantially dry gas from the drying chamber, the gas stream is passed upwardly through a subsidence chamber, preferably containing packing material, the cross-section of which chamber is relatively large as compared with that of the drying chamber, so that the velocity of the gas stream is materially reduced, with the result that the slow movement of the gas acts in conjunction with the surfaces of the packing to effect subsidence and removal from the gas stream of such mechanically entrained acid as may have been picked up by the gas in the drying chamber.

The advantages arising from the invention are numerous. Drying of the gas is accomplished by contact of the gas and a thin film of drying acid, thus avoiding a turbulent mixture of gas and acid and resulting increase of acid spray carried by the gas. Heat evolved by drying is removed at the point of generation by a flow of cooling water over the outside walls of the drying chamber. Formation of troublesome acid mist or vapor is avoided. Instead of recirculating large volumes of acid, the quantity of acid required, when operating with the present apparatus, is reduced to barely that necessary to wet the inner surface walls of the drying tower and to obtain good drying. A further outstanding advantage is that the elaborate cooling, piping and pumping system for cooling the acid after withdrawal from the drying towers is eliminated. The use of the present apparatus does necessitate the pumping and circulation of substantial quantities of water over the outer surfaces of the drying chambers to remove the heat generated, but the volume of water thus required to be circulated is considerably less than that heretofore necessarily employed in cooling the much larger tonnage acid in the supplementary coolers outside the drying towers.

Although the foregoing has been directed largely to the drying of sulfuric acid, as noted above, it is to be understood that the same applies to absorption even to a larger degree, since greater quantities of heat are evolved in the absorbing operation, and since it is likewise desirable to reduce to a minimum the acid spray contained in the exit gas stream. Hence, with but little modification, the apparatus of the present invention may be adapted for absorbing as well as drying operations.

In the accompanying drawings:

Figure 1 is a vertical section, taken on the line 1—1 of Fig. 2, of the drying apparatus constituting one embodiment of the invention;

Fig. 2 is a plan view thereof;

Fig. 3 is an enlarged vertical section showing a detail of construction at the upper end of one of the drying chambers;

Fig. 4 is a horizontal section on the line 4—4 of Fig. 3;

Fig. 5 is a fragmental vertical section of a portion of Fig. 1 showing the apparatus modified for use as an absorber; and Fig. 6 is a horizontal section on the line 6—6 of Fig. 1.

Referring to Fig. 1, the apparatus comprises principally a subsidence chamber 10, and a plurality of contact or drying chambers 11. All elements of the structure contacted by drying acid or gases are preferably made of lead or other suitable material resistant to the action of sulfuric acid. The vertically elongated cylindrical shell 12, forming the walls of the subsidence chamber 10, is sustained by upright supports 13 and the spaced circular members 14 attached to supports and the shell 12. The upper end of the shell is cone-shaped, and is connected to the gas main 16 through which the dried gases are conducted to the converters. A grille 17, extending across the lower end of the subsidence chamber 10 and carrying packing material 18, is suitably held in place by the uprights 13.

As indicated on the drawings, the diameter of the base 19 is larger than that of the subsidence chamber. Extending upwardly from the circumference of the base 19 is a channel member 20 which is attached to and supports the periphery of an annular plate 21 lying substantially in the same horizontal plane as the grille 17. The inner circular edge of the plate 21 is connected to the lower end of shell 12 by any suitable gas-tight joint. The plate 21, the circular channel member 20, and that portion of the base 19 extending outwardly beyond the lower ends of supports 13 form an annular chamber 23 which, together with the space 24 immediately beneath the grille 17, constitutes an outlet header for the several contact chambers and a gas inlet for the subsidence chamber 10.

As will be apparent from Fig. 2, the apparatus includes a large number of contact or drying chambers 11 disposed at regular intervals around the outside of the shell 12. Two of such contact chambers are shown in section in Fig. 1. The lower ends of the elongated, cylindrical tubes 26 extend through openings in the plate 21 and rest on the base 19. Projecting outwardly from the upper end of the shell 12 is a second annular plate 28 of approximately the same dimensions as the plate 21. Plate 28 may be suitably connected to the supports 13, as by a circular angle iron 29, and is provided with a series of openings, corresponding to those in plate 21, into which the tubes 26 are inserted. The upper ends of the tubes are attached to plate 28 in any suitable manner to make gas-tight connections.

Contact chambers 11 are provided with packing material supported therein by bars 30, extending diametrically across the bottom of each contact chamber and sloping downwardly toward the center of the apparatus. Resting directly on a bar 30 are two earthenware balls 31, each having a diameter somewhat larger than the radius of a tube 26. Immediately above the balls 31, the contact chambers contain comparatively small, irregularly-shaped packing material 32 extending upwardly approximately one-half the length of the tubes. The upper ends of the contact chambers are filled with larger-sized, approximately spherically-shaped packing 33. The purpose of packing the contact chambers in this manner will more fully appear.

Drying acid, or other treating liquid, is fed into the upper end of contact chambers 11 through acid headers 35 surrounding drying tubes 26 near the upper ends thereof. The acid headers 35 are connected through conduits 36, the circular supply pipe 37, and acid inlets 38 to a suitable source of supply of drying acid. The particular manner in which acid is introduced into the drying chambers constitutes an important part of the present invention, and the construction of apparatus therefor is disclosed in Fig. 4. The upper end of a drying chamber 11 communicates with its supply header 35 through a series of orifices 40 passing through the walls of the tube in such manner that the incoming acid from the header 35 is fed into the associated drying chamber tangentially. Because of the slight centrifugal force thus imparted to the incoming acid, an evenly distributed film of acid is formed on the upper walls of the drying chamber, and such film is maintained during the descent of the acid.

The lower end of each drying chamber 11 is provided with a vertically elongated gas outlet 42 opening toward the inner face of the channel 20. The material of the tube around the edge of outlet 42 is folded back to form acid deflecting lips 43. This arrangement is clearly illustrated in Fig. 6, the purpose of such construction being to prevent, as far as possible, any acid flowing down over the wall of the drying chamber near the gas outlet thereof from becoming entrained in the gas stream as the latter leaves the contact chamber. After running down over the inner walls of the reaction chambers, the acid is collected in the lower ends of the tubes 26, and is drained therefrom through the outlet openings 44. All acid passed through chambers 11 is withdrawn from the space 24 through a main acid outlet 45, and may be returned, by means of suitable pumps, to the acid supply pipe 37 through inlets 38.

The arrangement for flowing a film of cooling liquid, such as water, over the exterior walls of the drying chambers comprises overflow troughs 47 attached to the exterior wall of each tube immediately beneath the acid inlet headers 35. Troughs 47 may be supplied with water by connections similar to pipe 37 and inlets 36. The cooling liquid is collected in an annular trough 48, resting on the plate 21, and is discharged therefrom through an outlet 49.

Projecting upwardly from the periphery of plate 28 is a circular channel member 52, attached to and supporting the outer edge of an annular plate 53. The plates 28 and 53 together with the inner face of the channel 52 and that portion of the exterior surface of the cone-shaped top of the shell 12 lying between plates 28 and 53 form an annular gas inlet header 54. The main gas inlet pipe 55 is split into two branches 56 and 57 which open into the gas header 54 as indicated at 55 in Fig. 1. This arrangement is disclosed in plan in Fig. 2, and partly in section in Fig. 1.

The circular spacing of the contact chambers about the shell 12 is shown in Fig. 2. The annular plate 53 is provided at intervals immediately above the upper ends of the drying chambers 11 with openings 60. Each opening is somewhat wider than the diameter of the tubes 26, and may have such arcuate length as to extend over the upper ends of say three of the tubes. During operation, each opening is sealed by a suitable cover 61. This construction affords ready access to the interior of the header 54 and to the upper ends of the reaction chambers to facilitate packing and repair.

Fig. 5 shows the upper end of a contact chamber similar to that described in connection with Fig. 1, but modified slightly to adapt the apparatus for absorption rather than drying. The only alteration in the construction of Fig. 1 necessary to permit use of the apparatus for absorption operations lies in the provision of an inlet 64 to facilitate the introduction into the upper end of the reaction chambers of the necessary water or steam to reduce the absorbing acid strength to about 99% as required. The inlets 64 may, as indicated, project directly through the cover 61. Water or steam may be supplied to the inlets 64 from any source, and the inlet pipes 64 may include suitable connections to enable removal of the covers 61. In this modification of the apparatus, the acid inlet 35 may be disposed some distance below the trough 47 and the lower end of pipe 64 so as to permit removal by the water flowing over the outside of the upper end of tube 26 of some of the heat developed at the initial contact of gas and water or steam before the additional heat of reaction is evolved arising from the introduction of the acid.

The operation of the method in drying gases constituting the invention, is largely apparent from the foregoing description. Referring to Fig. 1, for example, sulfuric acid of strength of about 63° Bé. and at a temperature of around 80–85° F. may be introduced into the drying chambers 11 through inlets 36 and headers 35. As to the concentration of the acid, it is obvious that a fairly extensive range of acid strength is permissible, but for practical purposes it is preferable to use an acid of a strength of about 63° Bé. Because of the particular construction described, and illustrated in Figs. 3 and 4, the drying acid is fed into the upper ends of the chambers tangentially in such manner as to form a film of acid evenly distributed over the interior walls of the drying chambers. On initiation of the drying operation, the necessary quantity of cooling water is supplied to the outer surfaces of the drying chambers by overflowing the troughs 47. The gas to be dried, at a temperature of say 75–80° F., is introduced into the gas inlet header 54 through the gas main 55. On account of the particular arrangement of the apparatus embodying the several reaction chambers 11 with the common inlet header 54, the body of the gas is divided into and treated as a multiplicity of streams of comparatively small cross-section so that the maximum distance from any point of heat generation to a cooling surface is short. Since the drying action to which each small stream of gas is subjected is substantially the same, the action taking place in one chamber only need be detailed.

At the first contact of gas and acid in the upper end of a reaction chamber, drying tends to proceed with the greatest rapidity, and consequently the tendency to generate heat is the greatest. Hence, to avoid immediate evolution of a large quantity of heat, the upper end of the drying chamber in the zone of initial contact of gas and acid is packed with the comparatively large spheres 33. On account of the large-sized packing, maximum contact of acid and gas is not attained, and accordingly an undesirably large amount of heat is not evolved at this stage. It may be preferable to have no packing at all in a section at the top of the tubes. By this arrangement or by omitting packing in the upper end of the tubes, and packing the lower portions of the tubes in the manner indicated, i. e., the size of the packing decreasing toward the bottom of the tubes, because of the progressively increasing more intimate contact of gas and acid the quantity of heat generated may be readily controlled, thus preventing the formation of acid mist or vapor. Since water or other cooling liquid is being flowed over the outer surface of the chamber 11, the heat generated by the contact of the acid and gas, and retained in the acid, is transmitted directly through the walls of tube 26 to the cooling liquid. Since the supply of cooling liquid is being constantly renewed, and since the water is additionally cooled by evaporation, it is apparent that the heat transmitted to the cooling liquid from the acid through the walls of the tube is immediately removed. As the gas flows downwardly and drying proceeds, the gas enters the lower section of the drying chamber filled with irregular-shaped pebble-like packing 32. In this zone, because of the small size of the packing 32, greater contact of the gas with the acid on the walls of the drying chamber is brought about, thus increasing the drying effect, and gradually bringing to completion the drying operation.

During the downward flow of gas and acid, small particles of acid are more or less likely to become entrained in the gas stream. These particles of acid, at some point during the descent of the gas stream, are caught by and disposed on the surfaces of the packing material or returned to the acid film on the walls of the tube. The acid, after having passed downward through the drying chamber, is diverted from the gas outlet 42 by the lips 43 so that all acid still on the wall continues to remain thereon without any portions dropping into the outgoing gas stream. Such small portions of the acid as may have left the walls and is running down on the surfaces of the packing will, to a great extent, flow onto the two large spheres 31 at the bottom of the packing, and then onto the supporting bar sloping away from opening 42, whence it will return at the lower end of the bar to the acid film on the wall. Such small amount of acid as is neither on the wall nor caught on the spheres and bar will fall directly into the pool of acid in the bottom of the tube. The major portion of whatever spatter this may cause will either fail to fly out the narrow gas opening 42, or will impinge against the inner face of ring 20 immediately beyond. The aperture 42 through which the gas leaves the drying chamber at the bottom is such that no increase in velocity should occur, thus avoiding any increased carrying capacity of the gases for spray or spatter. Accordingly, drying of the gas and withdrawal of the same from the zone of contact with the acid is accomplished in such manner as to minimize the quantity of acid sprayed which may become entrained in the gas.

The combined cross-sections of space 24 and the annular chamber 23 is such that the velocities of the several incoming gas streams are reduced materially and to such extent that there is practically no tendency for the gas to pick up any spray from the acid collecting in the bottom of the apparatus, and being discharged through the outlet 45. In the space 24 beneath the grille 17, the gases unite into a single stream and rise slowly through the subsidence chamber 10. As will be apparent from the drawings, the cross section of subsidence chamber 10 is many times the combined cross-sections of drying chambers 11. For this reason, the velocity of the gas stream in chamber 10 is lowered to such degree that the slow movement of the gas in vertically upward direction and the surfaces of packing 18 act to effect subsidence and removal from the gas stream of substantially all the liquid which may have become entrained therein during treatment in the drying chamber, and not dropped out of the gas stream at the lower ends of the treating chambers. The substantially completely dried gas is then discharged through the conduit 16 into the main gas line of the system.

The relative proportions between the cross-sections of subsidence chamber 10 and the total cross-section of the drying chambers 11 may, of course, be varied to some extent. In the particular embodiment of the invention disclosed, these proportions are such that when chamber 10 is packed to about one-fourth its vertical length, the velocity of the gas while rising through chamber 10 is about one-fifth of the velocity of a gas stream descending through a drying chamber 11. When chamber 10 contains no packing, as may well be the case, the velocity of the gas stream in the chamber is further reduced to about one-fifteenth the velocity of a gas stream in a drying tower 11. However, in accordance with the preferred embodiment of the invention, packing material is employed. It will also be understood that a single drying chamber may be used in conjunction with a subsidence chamber, in which case the relative cross-sections of the two chambers may be adjusted in accordance with the foregoing to obtain the advantages arising from the invention. It will further be appreciated that counter-current flow of gas and acid in the treating chambers may be employed if desired.

When operating in accordance with the foregoing, the gas may leave the chamber 10 at a temperature of about 70°-80° F., and the heat removal from the acid is so complete, that in many cases, the temperature of the acid withdrawn through the outlet 21 is often two or three degrees less than that of the acid entering through headers 35. Upwards of 99% of the moisture may readily be extracted from the gas.

The foregoing principles likewise apply when employing the apparatus for absorption. For example, to effect absorption of sulphur trioxide from a gas stream containing the same, the necessary water or steam to reduce the absorbing acid strength to about 99% may be introduced into chambers 11 through inlets 64 of Fig. 5. The necessary water or steam might also be introduced at various points well down in the chambers, and thus reduce the strength of the absorbing acid as necessary. The same procedure may be followed in absorbing hydrochloric acid gas, except, of course, that the absorbing liquid is hydrochloric acid.

We claim:

1. The method of treating gases with acids which comprises passing a stream of the gas downwardly through a vertically disposed chamber of relatively small cross-section and contacting the gas therein with acid whereby acid-absorbable constituents are abstracted from the gas, heat generated by the treatment and particles of acid become entrained in the gas stream, removing heat from the zone of contact of acid and gas substantially as generated, withdrawing the gas from the contact zone, and then passing the gas upwardly through a second chamber of relatively large cross-section whereby the velocity of the gas stream is substantially reduced to effect subsidence and removal therefrom of entrained liquid particles.

2. The method of treating gases with acids which comprises distributing a film of acid over the inner wall of a vertically disposed chamber of relatively small cross-section, passing a stream of the gas downwardly through said chamber whereby acid-absorbable constituents are abstracted from the gas and particles of acid become entrained in the gas stream, passing cooling fluid over the outer side of said wall whereby the heat generated by the treatment is removed substantially as generated, withdrawing the gas from the chamber, and passing the gas upwardly through a vertically disposed second chamber of relatively large cross-section whereby the velocity of the gas stream is substantially reduced to effect subsidence and removal therefrom of entrained liquid particles.

3. Apparatus for treating gases with liquids comprising a shell forming a chamber having a gas inlet and a gas outlet, a plurality of treating chambers disposed about the shell, means for introducing gas to be treated into said chambers, means for feeding treating liquid into said chambers, means for discharging gas from said treating chambers into the first mentioned chamber, said first mentioned chamber having a cross-sectional area larger than the combined cross-sectional areas of the treating chambers, whereby the velocity of gas fed into the first mentioned chamber from the treating chambers is reduced to effect subsidence of liquid particles entrained in the gas.

4. Apparatus for treating gases with liquids comprising a shell forming a chamber having a gas inlet and a gas outlet, a plurality of treating chambers disposed about the shell, said treating chambers having a longitudinal dimension substantially equal to the longitudinal dimension of the first mentioned chamber, means for introducing gas to be treated into said treating chambers, means for forming films of treating liquid on one surface wall of the treating chambers, means for flowing cooling fluid over the opposite surface of said walls, means for discharging gas from the treating chambers into the first mentioned chamber, said first mentioned chamber having a cross-sectional area larger than that of the combined cross-sectional areas of the treating chambers, whereby the velocity of gas fed into the first mentioned chamber from the treating chambers is reduced to effect subsidence of liquid particles entrained in the gas.

EDWIN J. MULLEN.
WALTER S. ALLEN.